(12) United States Patent
Lin et al.

(10) Patent No.: US 12,173,110 B2
(45) Date of Patent: Dec. 24, 2024

(54) COMPOSITION, METHOD AND MATERIAL PREPARED FROM THE SAME

(71) Applicant: INDUSTRIAL TECHNOLOGY RESEARCH INSTITUTE, Hsinchu (TW)

(72) Inventors: Chi-Jui Lin, Taoyuan (TW); Shin-Liang Kuo, Hsinchu (TW); Shu-Jiuan Huang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 531 days.

(21) Appl. No.: 17/329,781

(22) Filed: May 25, 2021

(65) Prior Publication Data
US 2021/0371573 A1    Dec. 2, 2021

(30) Foreign Application Priority Data
May 29, 2020   (TW) .................................. 109118035

(51) Int. Cl.
| | | |
|---|---|---|
| *C08G 18/10* | (2006.01) | |
| *C08G 18/12* | (2006.01) | |
| *C08G 18/16* | (2006.01) | |
| *C08G 18/18* | (2006.01) | |
| *C08G 18/20* | (2006.01) | |

(Continued)

(52) U.S. Cl.
CPC ......... *C08G 18/10* (2013.01); *C08G 18/3206* (2013.01); *C08G 18/4845* (2013.01); *C08G 18/73* (2013.01); *C08G 18/755* (2013.01); *C08G 2110/0008* (2021.01)

(58) Field of Classification Search
None
See application file for complete search history.

(56) References Cited

U.S. PATENT DOCUMENTS

| | | |
|---|---|---|
| 4,110,266 A | 8/1978 | Sheratte |
| 4,162,995 A | 7/1979 | Sheratte |

(Continued)

FOREIGN PATENT DOCUMENTS

| | | |
|---|---|---|
| CN | 1135479 A | 11/1996 |
| CN | 102796279 A | 11/2012 |

(Continued)

OTHER PUBLICATIONS

Asahi et al., "Methanolysis investigation of commercially available polyurethane foam," Polymer Degradation and Stability, vol. 86, 2004, pp. 147-151.

(Continued)

*Primary Examiner* — Randy P Gulakowski
*Assistant Examiner* — Ha S Nguyen
(74) *Attorney, Agent, or Firm* — Birch, Stewart, Kolasch & Birch, LLP

(57) ABSTRACT

A composition and a material prepared from the composition are provided. The composition includes 50-99 parts by weight of a polyether polyol and 1-50 parts by weight of a compound having a structure represented by Formula (I)

Formula (I)

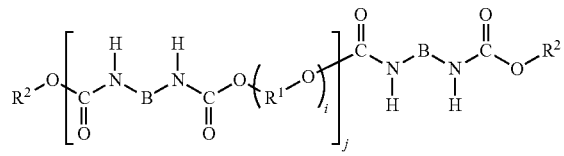

wherein $R^1$ is $C_{1-6}$ independent alkylene group; $R^2$ is

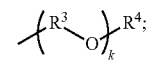

$R^3$ is independently $C_{1-6}$ alkylene group; $i \geq 1$; $j \geq 0$; $k=0$, 1, or 2; $R^4$ is $C_{1-24}$ alkyl group when $k=1$, or 2, or $R^4$ is $C_{6-24}$ alkyl group when $k$ is 0; and B is independently

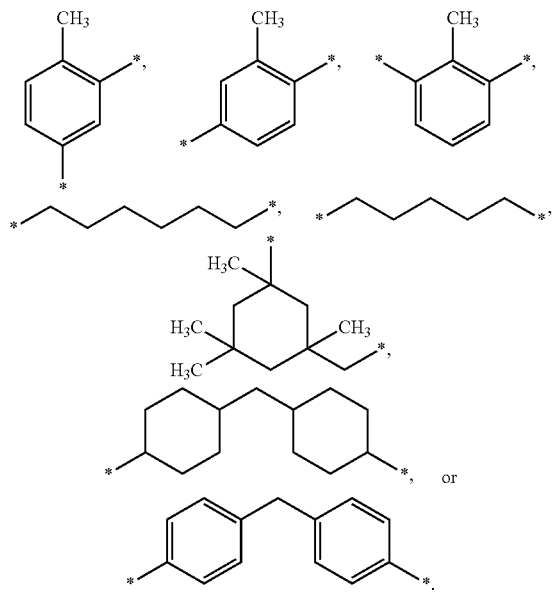

16 Claims, No Drawings

(51) Int. Cl.
*C08G 18/24* (2006.01)
*C08G 18/28* (2006.01)
*C08G 18/32* (2006.01)
*C08G 18/48* (2006.01)
*C08G 18/73* (2006.01)
*C08G 18/75* (2006.01)

(56) References Cited

U.S. PATENT DOCUMENTS

| | | |
|---|---|---|
| 5,410,008 A | 4/1995 | Bauer |
| 5,879,608 A | 3/1999 | Lammeck et al. |
| 6,020,386 A | 2/2000 | Münzmay et al. |
| 6,069,182 A | 5/2000 | Naber et al. |
| 6,156,811 A | 12/2000 | Lammeck et al. |
| 6,235,806 B1 | 5/2001 | Ohga et al. |
| 6,245,822 B1 | 6/2001 | Terada et al. |
| 6,489,373 B2 | 12/2002 | Kodama et al. |
| 7,943,676 B2 | 5/2011 | Chang |
| 8,883,867 B2 | 11/2014 | Fan et al. |
| 9,951,171 B2 | 4/2018 | Tabor et al. |
| 2009/0023823 A1 | 1/2009 | Kim et al. |
| 2019/0169351 A1 | 6/2019 | Sesoko et al. |

FOREIGN PATENT DOCUMENTS

| | | | |
|---|---|---|---|
| CN | 102617352 B | 4/2014 | |
| CN | 108779231 A | 11/2018 | |
| CN | 108779284 A | 11/2018 | |
| EP | 1106634 A1 * | 6/2001 | ............ C08G 18/10 |
| TW | 202000727 A | 1/2020 | |
| WO | WO 2018/091568 A1 | 5/2018 | |

OTHER PUBLICATIONS

Taiwanese Office Action issued in Application No. 109118035, dated Dec. 9, 2020.
Chinese Office Action and Search Report for Chinese Application No. 202110052886.4, dated Aug. 12, 2022.

* cited by examiner

COMPOSITION, METHOD AND MATERIAL PREPARED FROM THE SAME

CROSS REFERENCE TO RELATED APPLICATIONS

The application is based on, and claims priority from, Taiwan Application Serial Number 109118035, filed on May 29, 2020, the disclosure of which is hereby incorporated by reference herein in its entirety.

TECHNICAL FIELD

The disclosure relates to a composition, method and material prepared from the same.

BACKGROUND

Polyurethane products (such as soft or hard polymer foam, coating, sealant, or adhesive) have been widely applied in automotive parts and electronic equipment. In order to solve the problem of waste disposal of polyurethane products, the industry has developed techniques to recover valuable resources from polyurethane waste.

The chemical recovery technology of polyurethane is mainly alcoholysis. Catalysts are used to accelerate the transesterification of polyols and urethane bonds to convert polyurethane into polyether polyols and aromatic dicarbamate polyols by-product. The single-phase alcoholysis method employs polyol (which has a polarity similar to original polyether polyol) (such as dipropylene glycol) serving as an alcoholysis agent, and the product (after subjecting polyurethane to alcoholysis) is homogeneous. However, due to the benzene ring structure, small molecular weight and high hydroxyl value, the isocyanate-derived polyols cannot be used in soft foaming. The split-phase alcoholysis method employs polyol with higher polarity (such as diethylene glycol and glycerin) serving as an alcoholysis agent, wherein the higher portion of the stratification is polyether polyol and polyol alcoholysis agent. However, in addition to purification and removal of the alcoholysis agent, the split-phase alcoholysis method also produces a large amount of isocyanate-derived polyol by-product.

Therefore, a novel recovery process is desired for solving the aforementioned problems

SUMMARY

According to embodiments of the disclosure, the composition includes 50-99 parts by weight of polyether polyol, and 1-50 parts by weight of at least one compound having a structure represented by Formula (I)

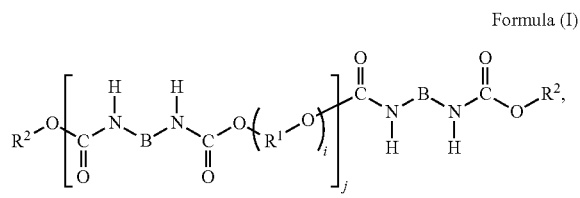

Formula (I)

wherein the polyether polyol has a weight average molecular weight (Mw) of 200 to 10,000; $R^1$ is independently $C_{1-6}$ alkylene group; $R^2$ is

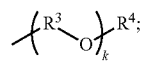

$R^3$ is $C_{1-6}$ alkylene group; $i \geq 1$; $j \geq 0$; $k=0$, 1, or 2; $R^4$ is $C_{1-24}$ alkyl group when k is 1 or 2, or $R^4$ is $C_{6-24}$ alkyl group when k is 0; and B is independently

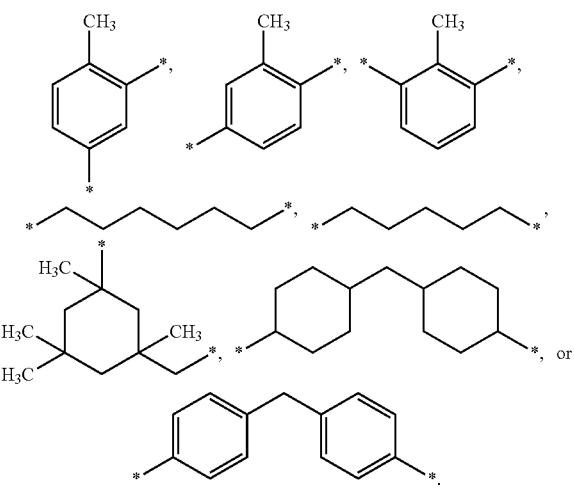

According to embodiments of the disclosure, the polyether polyol of the disclosure has a structure represented by Formula (II)

Formula (II)

wherein $R^5$ can be independently $C_{1-6}$ alkylene group; and $n>1$.

According to embodiments of the disclosure, the composition of the disclosure can serve as an adhesive composition, or a composition for preparing a foam. Herein, the composition can further include a diisocyanate compound.

The disclosure also provides a method for preparing a composition in order to prepare the composition of the disclosure.

The disclosure also provides a material, wherein the material is prepared from the composition of the disclosure.

According to embodiments of the disclosure, the disclosure provides a foam, wherein the foam can be prepared from the composition of the disclosure. According to embodiments of the disclosure, the foam can be a product of the composition of the disclosure prepared from a foaming process.

A detailed description is given in the following embodiments.

DETAILED DESCRIPTION

The composition, method and material prepared from the same of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. As used herein, the term "about" in quantitative terms refers to plus or minus an amount that is general and reasonable to persons skilled in the art.

The disclosure provides a composition, a method thereof and a material prepared from the composition. According to embodiments of the disclosure, the composition is a homogeneous composition and includes an isocyanate-derived compound (prepared by subjecting a polyurethane to alcoholysis) and a polyether polyol, wherein the isocyanate-derived compound does not have a hydroxyl group. Since the disclosure employs specific monohydric alcohol (having specific chemical structure) serving as an alcoholysis agent for subjecting polyurethane to alcoholysis, the obtained isocyanate-derived compound via alcoholysis does not include active hydroxyl group. When the composition of the disclosure can further serve as an adhesive composition or a composition for preparing a foam, the isocyanate-derived compound of composition of the disclosure merely serves as organic filler, and does not affect the subsequent reaction of polyether polyol. In addition, the homogeneous composition of the disclosure is prepared at atmospheric pressure in the presence of specific monohydric alcohol. As a result, the obtained composition after alcoholysis can be directly applied in polyurethane foaming (i.e. no further purification is required to remove compounds containing hydroxyl group other than polyether polyol) due to the low hydroxyl value of the homogeneous composition. As a result, in comparison with the conventional polyurethane alcoholysis (which employs dihydric alcohol (or polyol) serving as an alcoholysis agent (i.e. isocyanate-derived compound having terminal hydroxyl group is produced), the composition of the disclosure is suitable for mass production and increase economic efficiency.

According to embodiments of the disclosure, the composition of the disclosure includes about 50-99 parts by weight (such as about 55, 60, 65, 70, 75, 80, 85, 90, or 95 parts by weight) of polyether polyol, and about 1-50 parts by weight (such as about 5, 10, 15, 20, 25, 30, 35, 40, or 45 parts by weight) of at least one has a structure represented by Formula (I) of compound Formula (I)

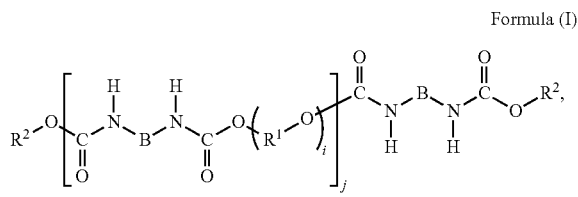

wherein the polyether polyol has a weight average molecular weight (Mw) of 200 to 10,000; $R^1$ can be independently $C_{1-6}$ alkylene group; $R^2$ is

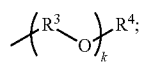

$R^3$ is $C_{1-6}$ alkylene group; $i \geq 1$; $j \geq 0$; $k=0$, 1, or 2; $R^4$ is $C_{1-24}$ alkyl group when k is 1 or 2, or $R^4$ is $C_{6-24}$ alkyl group when k is 0; and B is independently

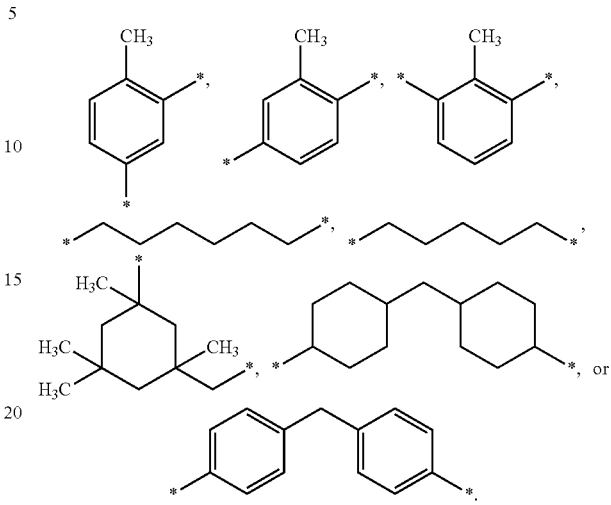

According to embodiments of the disclosure, the polyether polyol of the disclosure has a structure represented by Formula (II)

Formula (II)

wherein $R^5$ can be independently $C_{1-6}$ alkylene group; and n>1.

According to embodiments of the disclosure, the polyether polyol having a structure represented by Formula (II) has a weight average molecular weight (Mw) about 200 to 10,000, such as about 200 to 9,000, about 200 to 8,000, about 200 to 7,000, about 200 to 6,000, about 500 to 10,000, about 1,000 to 10,000, or about 1000 to 8000. According to embodiments of the disclosure, the polyether polyol having a structure represented by Formula (II) can be a homopolymer or copolymer of at least one monomer via polymerization, wherein the monomer can be epoxyethane, propylene epoxide, epoxybutane, tetrahydrofuran (THF), oxetane, glycerol, trimethylolpropane, ethylene glycol, propylene glycol, butylene glycol, or pentylene glycol. For example, the polyether polyol can be polyethylene glycol (PEG), polypropylene glycol, polybutylene glycol, propylene epoxide-epoxyethane copolymer, glycerol-propylene epoxide-epoxyethane copolymer, trimethylolpropane-propylene epoxide-epoxyethane copolymer, ethylene glycol-propylene epoxide-epoxyethane copolymer, propylene glycol-propylene epoxide-epoxyethane copolymer, or polytetrahydrofuran. According to embodiments of the disclosure, i can be an integer from 4 to 226, such as an integer from 10 to 200, an integer from 20 to 180, an integer from 50 to 150, or an integer from 70 to 150.

According to embodiments of the disclosure, $C_{1-6}$ alkylene group can be a linear or branched alkylene group. For example, $C_{1-6}$ alkylene group can be methylene group, ethylene group, propylene group, butylene group, pentylene group, hexylene group or an isomer thereof. According to embodiments of the disclosure, $C_{1-24}$ alkyl group can be linear or branched alkyl group. For example, $R^4$ can be hexyl, heptyl, octyl, nonyl, decyl, undecyl, dodecyl, tridecyl, tetradecyl, pentadecyl, hexadecyl, heptadecyl, octadecyl, or an isomer thereof when k is 0. $R^4$ can be methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, or an isomer thereof when k is 1 or 2.

According to embodiments of the disclosure, $R^2$ can be a residual moiety of a monohydric alcohol eliminating a hydroxyl group, wherein the monohydric alcohol is 1-hexanol, 1-heptanol, 1-octanol, isooctyl alcohol, 1-nonanol, isononanol, 1-decanol, 1-undecyl alcohol, lauryl alcohol, 1-tridecyl alcohol, isotridecyl alcohol, 1-tetradecanol, 1-pentadecanol, 1-hexadecanol, 1-n-heptadecanol, 1-octadecyl alcohol, diethylene glycol monomethyl ether, diethylene glycol monoethyl ether, diethylene glycol monobutyl ether, or 2-butoxyethanol.

According to embodiments of the disclosure, B can be a residual moiety of a diisocyanate compound eliminating two isocyanate groups, wherein the diisocyanate compound is 2,4-toluene diisocyanate, 2,5-toluene diisocyanate, 2,6-toluene diisocyanate, hexamethylene diisocyanate, pentamethylene diisocyanate, isophorone diisocyanate, 4,4'-Methylene dicyclohexyl diisocyanate, or 4,4'-methylenediphenyl diisocyanate.

According to embodiments of the disclosure, the total weight of the polyether polyol and the compound having a structure represented by Formula (I) is 100 parts by weight.

According to embodiments of the disclosure, compound having a structure represented by Formula (I) can be

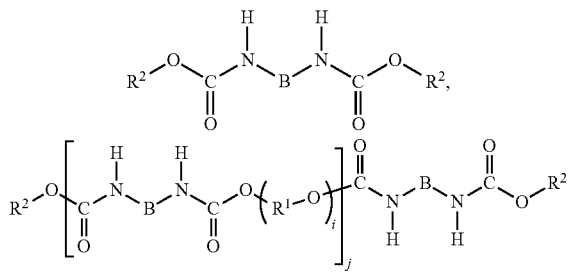

(wherein i≥1, j≥1).

According to embodiments of the disclosure, the compounds of

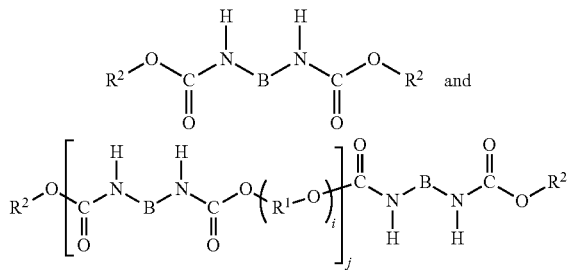

and (wherein i>1, j≥1) are isocyanate-derived compounds. Namely, when subjecting the polyurethane to an alcoholysis in the presence of specific monohydric alcohol (having a specific structure) serving as an alcoholysis agent, the obtained isocyanate-derived compound can simultaneously include aforementioned two isocyanate-derived compounds.

According to embodiments of the disclosure, in the compound having a structure represented by Formula (I), j can be an integer from 1 to 30, such as an integer from 1 to 25, an integer from 1 to 20, an integer from 1 to 15, an integer from 1 to 10, or an integer from 1 to 5. For example, j can be 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. According to embodiments of the disclosure, in the compound having a structure represented by Formula (I), the moiety represented by

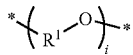

has a weight average molecular weight (Mw) of about 200 to 10,000, such as about 200 to 9,000, about 200 to 8,000, about 200 to 7,000, about 200 to 6,000, about 500 to 10,000, about 1,000 to 10,000, or about 1,000 to 8,000. According to embodiments of the disclosure, the moiety represented by

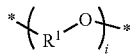

is derived from a polyether polyol. For example, the polyether polyol can be polyethylene glycol (PEG), polypropylene glycol, polybutylene glycol, propylene epoxide-epoxyethane copolymer, glycerol-propylene epoxide-epoxyethane copolymer, trimethylolpropane-propylene epoxide-epoxyethane copolymer, ethylene glycol-propylene epoxide-epoxyethane copolymer, propylene glycol-propylene epoxide-epoxyethane copolymer, or polytetrahydrofuran. According to embodiments of the disclosure, i can be an integer from 4 to 226, such as an integer from 10 to 200, an integer from 20 to 180, an integer from 50 to 150, or an integer from 70 to 150.

According to embodiments of the disclosure, the composition of the disclosure can include two or at least two compounds having the structure represented by Formula (I). When the composition of the disclosure can include two or at least two compounds having the structure represented by Formula (I), the $R^1$, $R^2$, B, and i of the compounds having the structure represented by Formula (I) are the same, and j are distinct from each other.

According to embodiments of the disclosure, even though the composition of the disclosure simultaneously includes the polyether polyol having a structure represented by Formula (II) and the compound having a structure represented by Formula (I), the composition can be still a homogeneous composition. In addition, when the composition of the disclosure includes two or at least two compounds having the structure represented by Formula (I), the two or at least two compounds having the structure represented by Formula (I) can be isocyanate-derived compounds without hydroxyl group. As a result, when the composition of the disclosure further serves as an adhesive composition or a composition for preparing a foam, the isocyanate-derived compound (compound having a structure represented by Formula (I)) of the composition of the disclosure merely serves as organic filler and does not affect the subsequent reaction of polyether polyol.

According to embodiments of the disclosure, the composition of the disclosure can further include a diisocyanate compound, and the composition can serve as an adhesive composition, or a composition for preparing a foam. According to embodiments of the disclosure, the diisocyanate compound can be 2,4-toluene diisocyanate, 2,5-toluene diisocyanate, 2,6-toluene diisocyanate, hexamethylene diisocyanate, pentamethylene diisocyanate, isophorone diisocyanate, 4,4'-methylene dicyclohexyl diisocyanate, 4,4'-methylenediphenyl diisocyanate, lysine diisocyanate, or a combination thereof. According to embodiments of the disclosure, in the composition of the disclosure, in order to force the polyether polyol having a structure represented by Formula (II) reacting with the diisocyanate compound completely, the molar ratio of the diisocyanate compound to the polyether polyol can be about 1:1 to 2.2:1.

According to embodiments of the disclosure, the composition can further include an additive. The amount of the additive is not limited and can be optionally modified by a person of ordinary skill in the field. For example, the composition can further include about 0.1 to 30 parts by weight of additive, such as about 0.1 to 25 parts by weight, 0.1 to 20 parts by weight, 0.1 to 15 parts by weight, or 0.1 to 10 parts by weight. Herein, the total weight of the polyether polyol and the compound having a structure represented by Formula (I) is 100 parts by weight, wherein the additive is organic metal catalyst (such as: dibutyltin dilaurate, stannous octoate, dibutyltin diacetate, dioctyltin diacetate, dibutyltin maleate, dibutyltin di-2-ethylhexanoate, or dibutyltin dimercaptide), amine catalyst (such as: triethylene diamine, or triethylamine), cross-linking agent, blowing agent, foam stabilizer, plasticizer, melt strength enhancer, antioxidant, antistick agent, antistatic agent, flame retardant, water, or a combination thereof.

According to embodiments of the disclosure, the method for subjecting the polyurethane to an alcoholysis of the disclosure can include the following steps. First, a monohydric alcohol and a catalyst are mixed, obtaining a mixture. Next, the mixture is heated to 150° C.-230° C. Next, the polyurethane is added to the mixture and the result is subjected to an alcoholysis under nitrogen atmosphere to obtain a product. The process time period can be 1 hour to 24 hours. After alcoholysis, the polyurethane alters to a polyether polyol and an isocyanate-derived compound. Therefore, the product can include catalyst, polyether polyol and isocyanate-derived compound. According to embodiments of the disclosure, the isocyanate-derived compound can include at least one compound having a structure represented by Formula (I). Herein, according to the alcoholysis degree, the isocyanate-derived compound can be classified as a monomer isocyanate-derived compound and an oligomer isocyanate-derived compound. The amount of monomer isocyanate-derived compound is directly proportional to the alcoholysis degree of polyurethane; and the amount of oligomer isocyanate-derived compound is inversely proportional to the alcoholysis degree of polyurethane. The alcoholysis degree of polyurethane can be adjusted by the process time period and the temperature of the alcoholysis.

It should be noted that the obtained isocyanate-derived compound, which is prepared from the method for subjecting the polyurethane to alcoholysis of the disclosure (i.e. a compound having at least one structure represented by Formula (I)), does not have hydroxyl group (i.e. isocyanate-derived compound without hydroxyl group). According to embodiments of the disclosure, the product, which is prepared from the method for subjecting the polyurethane to alcoholysis, can be purified by a vacuum distillation process to remove unreacted monohydric alcohol.

According to embodiments of the disclosure, the catalyst can be organic metal catalyst, amine catalyst, or a combination thereof. For example, the organic metal catalyst can be dibutyltin dilaurate, stannous octoate, dibutyltin diacetate, dioctyltin diacetate, dibutyltin maleate, dibutyltin di-2-ethylhexanoate, dibutyltin dithiolate, methyltin tris(isooctyl thioglycollate), or methyltin mercaptide. The amine catalyst can be triethylene diamine, or triethylamine. According to embodiments of the disclosure, the polyurethane can be 2,4-toluene diisocyanate, 2,5-toluene diisocyanate, 2,6-toluene diisocyanate, hexamethylene diisocyanate, pentamethylene diisocyanate, isophorone diisocyanate, 4,4'-methylene dicyclohexyl diisocyanate, 4,4'-methylenediphenyl diisocyanate, lysine diisocyanate, or a combination thereof. According to embodiments of the disclosure, the monohydric alcohol can have a structure represented by Formula (III)

Formula (III)

wherein $R^3$ is independently $C_{1-6}$ alkylene group; m is 0, 1, or 2; and $R^4$ is $C_{1-24}$ alkyl group when m is 1 or 2, or $R^4$ is $C_{6-24}$ alkyl group when m is 0. According to embodiments of the disclosure, the monohydric alcohol has a boiling point greater than or equal to 170° C. As a result, the polyurethane can be subjected to alcoholysis with the monohydric alcohol (having a structure represented by Formula (III)) of the disclosure at 150° C.-230° C. and atmospheric pressure (i.e. about 1 atm). According to embodiments of the disclosure, the monohydric alcohol can be 1-hexanol, 1-heptanol, 1-octanol, isooctyl alcohol, 1-nonanol, isononanol, 1-decanol, 1-undecyl alcohol, lauryl alcohol, 1-tridecyl alcohol, isotridecanol, 1-tetradecanol, 1-pentadecanol, 1-hexadecanol, 1-n-heptadecanol, 1-octadecyl alcohol, diethylene glycol monomethyl ether, diethylene glycol monoethyl ether, diethylene glycol monobutyl ether, or ethylene glycol monobutyl ether. According to embodiments of the disclosure, the weight ratio of the monohydric alcohol to the catalyst can be about 5 to 200, such as 5, 10, 15, 20, 50, 80, 100, 120, 150, 180, or 200. According to embodiments of the disclosure, the weight of the polyurethane to the monohydric alcohol can be about 1 to 10, such as 1, 2, 3, 4, 5, 6, 7, 8, 9, or 10.

According to embodiments of the disclosure, a polyether polyol is provided to mix with the monohydric alcohol and the catalyst during the process for preparing the mixture. According to embodiments of the disclosure, the polyether polyol can be a homopolymer or copolymer prepared from at least one monomers, wherein the monomer can be epoxyethane, propylene epoxide, epoxybutane, tetrahydrofuran (THF), oxetane, glycerol, trimethylolpropane, ethylene glycol, propylene glycol, butylene glycol, or pentylene glycol. For example, the polyether polyol can be polyethylene glycol (PEG), polypropylene glycol, polybutylene glycol, propylene epoxide-epoxyethane copolymer, glycerol-propylene epoxide-epoxyethane copolymer, trimethylolpropane-propylene epoxide-epoxyethane copolymer, ethylene glycol-propylene epoxide-epoxyethane copolymer, propylene glycol-propylene epoxide-epoxyethane copolymer, or polytetrahydrofuran. According to embodiments of the disclosure, the weight ratio of the polyether polyol to the monohydric alcohol can be about 1 to 10, such as 1, 2, 3, 4, 5, 6, 7, 8, 9, or 10.

According to some embodiments of the disclosure, the composition of the disclosure includes a product which is prepared by reacting polyurethane with a specific monohydric alcohol to undergo an alcoholysis. Herein, the subsequent reaction of polyether polyol would be slightly affected (such as reacting polyether polyol with diisocyanate compound to obtain a polyurethane) even if a little of monohydric alcohol remains in the composition, since the monohydric alcohol has only one hydroxyl group. According to some embodiments of the disclosure, the composition of the disclosure includes the product, prepared by reacting polyurethane and the specific monohydric alcohol to undergo an alcoholysis, in the absence of residual monohydric alcohol. For example, the monohydric alcohol (serving as an alcoholysis agent) can be removed by vacuum distillation process. According to embodiments of the disclosure, besides of the product prepared by reacting polyurethane with specific monohydric alcohol to undergo an alcoholysis, the composition of the disclosure may additionally include polyether polyol, in order to achieve a default weight ratio of the polyether polyol having a structure represented by Formula (II) to the compound having a structure represented by Formula (I). According to embodiments of the disclosure, in the composition of the disclosure, the polyether polyol having the structure represented by Formula (II) is the only one which has a hydroxyl group. According to embodiments of the disclosure, due to the monohydric alcohol having the structure represented by Formula (III), the product prepared by reacting polyurethane with a specific monohydric alcohol to undergo an alcoholysis can be a homogeneous composition, and the homogeneous composition has a relatively low hydroxyl value. According to embodiments of the disclosure, the composition of the disclosure has a hydroxyl value of about 10 mgKOH/g to 80 mgKOH/g, such as 10 mgKOH/g to 70 mgKOH/g, or 10 mgKOH/g to 60 mgKOH/g. As a result, the product, which is prepared by the method for subjecting the polyurethane to an alcoholysis of the disclosure, can be directly applied to polyurethane foaming (i.e. no further purification is required to remove compounds containing hydroxyl group other than polyether polyol).

The isocyanate-derived compound, prepared by the conventional method for subjecting the polyurethane to an alcoholysis in the presence of polyol serving as an alcoholysis agent, is aromatic dicarbamate polyol. Therefore, the obtained product prepared by alcoholysis of polyurethane has high hydroxyl value, thus the application of the product is limited. For example, when applying the product with high hydroxyl value of polyurethane alcoholysis in the polyurethane soft foaming to prepare polyurethane foam, the foamability of the polyurethane foam is reduced, the closed porosity of polyurethane foam is increased, and the foam cells are not effectively formed (i.e. the foam will shrink significantly to form a denser material after cooling) resulting from the crosslinking efficiency is increased due to the aromatic dicarbamate polyol of the product. In addition, the foamability of the foam prepared by soft foaming is reduced, when the amount of aromatic dicarbamate polyol in the composition is equal to or greater than 2 parts by weight. Therefore, when applying the product, prepared by the conventional method for subjecting the polyurethane employing the polyol to undergo an alcoholysis, in the soft foaming, the isocyanate-derived compound (i.e. aromatic dicarbamate polyol) should be removed. Since the method of the disclosure employs the specific monohydric alcohol to perform polyurethane alcoholysis, the obtained isocyanate-derived compound does not have hydroxyl group. Therefore, the isocyanate-derived compound would not affect the subsequent reaction of the polyether polyol in the composition (i.e. the isocyanate-derived compound (without hydroxyl group) merely serves as organic filler and does not react with diisocyanate), even though the amount of the isocyanate-derived compound without hydroxyl group is about 20 parts by weight. In addition, when the short-chain monohydric alcohol (such as methanol, ethanol, or propanol) serves as an alcoholysis agent, the isocyanate-derived compound with hydroxyl group is not obtained after subjecting the polyurethane to alcoholysis, but a high-level process equipment is required since the alcoholysis of polyurethane should be performed under a high temperature/high pressure condition (such as 160° C.-300° C., 15 MPa) due to the low boiling point of short-chain monohydric alcohol.

According to embodiments of the disclosure, the disclosure provides a method for preparing a composition. The method includes the following steps. 1-50 parts by weight of an organic filler is provided, wherein the organic filler is an isocyanate-derived compound prepared by reacting a monohydric alcohol with a polyurethane to undergo an alcoholysis. Next, 50-99 parts by weight of polyether polyol is provided, wherein the total weight of the organic filler and polyether polyol is 100 parts by weight. Next, a diisocyanate compound is provided, wherein the molar ratio of the diisocyanate compound to the polyether polyol is 1:1 to 2.2:1. Next, the organic filler, the polyether polyol, and the diisocyanate compound are mixed, obtaining the composition.

According to embodiments of the disclosure, the organic filler having a structure represented by Formula (I)

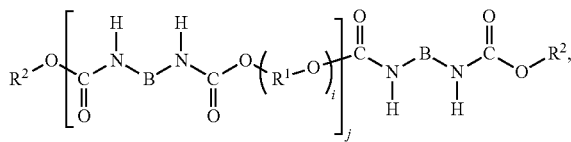

Formula (I)

wherein $R^1$ is independently $C_{1-6}$ alkylene group; $R^2$ is

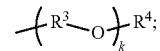

$R^3$ is $C_{1-6}$ alkylene group; $i \geq 1$; $j \geq 0$; $k=0$, 1, or 2; $R^4$ is $C_{1-24}$ alkyl group when k is 1 or 2, or $R^4$ is $C_{6-24}$ alkyl group when k is 0; and B is independently

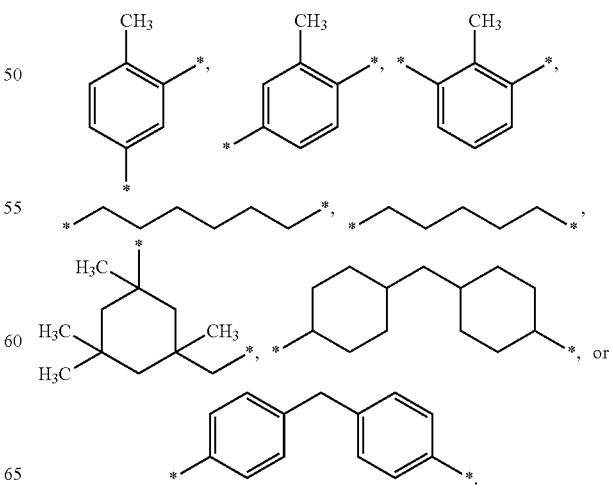

According to embodiments of the disclosure, the polyether polyol is prepared by subjecting the polyurethane to an alcoholysis.

According to embodiments of the disclosure, the weight average molecular weight (Mw) of polyether polyol is about 200 to 10,000. According to embodiments of the disclosure, the polyether polyol can be a homopolymer or copolymer of at least one monomer, wherein the monomer can be epoxyethane, propylene epoxide, epoxybutane, tetrahydrofuran, oxetane, glycerol, trimethylolpropane, ethylene glycol, propylene glycol, butylene glycol, or pentylene glycol. For example, the polyether polyol can be polyethylene glycol (PEG), polypropylene glycol, polybutylene glycol, propylene epoxide-epoxyethane copolymer, glycerol-propylene epoxide-epoxyethane copolymer, trimethylolpropane-propylene epoxide-epoxyethane copolymer, ethylene glycol-propylene epoxide-epoxyethane copolymer, propylene glycol-propylene epoxide-epoxyethane copolymer, or polytetrahydrofuran.

According to embodiments of the disclosure, the monohydric alcohol can be 1-hexanol, 1-heptanol, 1-octanol, isooctyl alcohol, 1-nonanol, isononanol, 1-decanol, 1-undecyl alcohol, lauryl alcohol, 1-tridecyl alcohol, isotridecyl alcohol, 1-tetradecanol, 1-pentadecanol, 1-hexadecanol, 1-n-heptadecanol, 1-octadecyl alcohol, diethylene glycol monomethyl ether, diethylene glycol monoethyl ether, diethylene glycol monobutyl ether, or 2-butoxyethanol.

According to some embodiments of the disclosure, the disclosure also provides a material, wherein the material can be prepared by the composition of the disclosure. According to some embodiments of the disclosure, the material can include the cured product of the composition of the disclosure. According to embodiments of the disclosure, the composition of the disclosure can serve as an adhesive composition. Therefore, the material can serve as an adhesive layer. According to embodiments of the disclosure, since the composition of the disclosure can serve as a composition for preparing a foam, the material can be foam.

According to embodiments of the disclosure, the disclosure provides a foam, wherein the foam is prepared from the composition of the disclosure. According to embodiments of the disclosure, the foam can a product of the composition of the disclosure via a foaming process.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

250 g of polyurethane (prepared by reacting 2,4-toluene diisocyanate with polypropylene glycol) (with a weight average molecular weight (Mw) of about 3000) foam was cut by a cutter, obtaining a polyurethane broken foam with a width less than 3 cm. Next, 200 g of isooctyl alcohol, 542 g of polypropylene glycol (with a weight average molecular weight (Mw) of about 3,000), and 8 g of stannous octoate was sequentially added into a reaction bottle, obtaining a mixture after stirring under nitrogen atmosphere. Next, the reaction bottle was heated to 170° C. Next, polyurethane broken foam was added into the reaction bottle with a feed rate of 50 g/minute to perform a polyurethane alcoholysis, and a polyurethane alcoholysis was performed at a temperature of 170° C. and a rotating rate of 150 rpm under atmospheric pressure for 6 hours. Next, the result was subjected to a vacuum distillation process (5 torr, 190° C.) to remove remaining isooctyl alcohol, obtaining Composition (1), wherein Composition (1) was a homogeneous composition. Next, hydroxyl value and amine value of Composition (1) were measured, and the results are shown in Table 1.

Preparation Example 2

250 g of polyurethane (prepared by reacting 2,4-toluene diisocyanate with polypropylene glycol) (with a weight average molecular weight (Mw) of about 5,000) foam was cut by a cutter, obtaining a polyurethane broken foam with a width less than 3 cm. Next, 200 g of isooctyl alcohol, 542 g of polypropylene glycol (with a weight average molecular weight (Mw) of about 5,000), and 8 g of stannous octoate was sequentially added into a reaction bottle, obtaining a mixture after stirring under nitrogen atmosphere. Next, the reaction bottle was heated to 170° C. Next, polyurethane broken foam was added into the reaction bottle with a feed rate of 50 g/minute, and a polyurethane alcoholysis was performed at a temperature of 170° C. and a rotating rate of 150 rpm under atmospheric pressure for 6 hours. Next, the result was subjected to a vacuum distillation process (5 torr, 190° C.) to remove remaining isooctyl alcohol, obtaining composition (2), wherein Composition (2) was a homogeneous composition. Next, hydroxyl value and amine value of Composition (2) were measured, and the results are shown in Table 1.

Preparation Example 3

250 g of polyurethane (prepared by reacting 2,4-toluene diisocyanate with polypropylene glycol) (with a weight average molecular weight (Mw) of about 3,000) foam was cut by a cutter, obtaining a polyurethane broken foam with a width less than 3 cm. Next, 50 g of diethylene glycol monoethyl ether, 692 g of polypropylene glycol (with a weight average molecular weight (Mw) of about 3,000), and 8 g of stannous octoate was sequentially added into a reaction bottle, obtaining a mixture after stirring under nitrogen atmosphere. Next, the reaction bottle was heated to 170° C. Next, polyurethane broken foam was added into the reaction bottle with a feed rate of 50 g/minute, and a polyurethane alcoholysis was performed at a temperature of 170° C. and a rotating rate of 150 rpm under atmospheric pressure for 6 hours. Next, the result was subjected to a vacuum distillation process (5 torr, 190° C.) to remove remaining isooctyl alcohol, obtaining Composition (3), wherein Composition (3) was a homogeneous composition. Next, hydroxyl value and amine value of Composition (3) were measured, and the results are shown in Table 1.

Preparation Example 4

250 g of polyurethane (prepared by reacting 2,4-toluene diisocyanate with polypropylene glycol) (with a weight average molecular weight (Mw) of about 3,000) foam was cut by a cutter, obtaining a polyurethane broken foam with a width less than 3 cm. Next, 50 g of octadecan-1-ol, 692 g of polypropylene glycol (with a weight average molecular weight (Mw) of about 3,000), and 8 g of stannous octoate was sequentially added into a reaction bottle, obtaining a mixture after stirring under nitrogen atmosphere. Next, the reaction bottle was heated to 170° C. Next, polyurethane broken foam was added into the reaction bottle with a feed rate of 50 g/minute, and a polyurethane alcoholysis was performed at a temperature of 170° C. and a rotating rate of 150 rpm under atmospheric pressure for 6 hours. Next, the result was subjected to a vacuum distillation process (5 torr, 190° C.) to remove remaining isooctyl alcohol, obtaining Composition (4), wherein Composition (4) was a homogeneous composition. Next, hydroxyl value and amine value of Composition (4) were measured, and the results are shown in Table 1.

Preparation Example 5

250 g of polyurethane (prepared by reacting 2,4-toluene diisocyanate with polypropylene glycol) (with a weight average molecular weight (Mw) of about 3,000) foam was cut by a cutter, obtaining a polyurethane broken foam with a width less than 3 cm. Next, 50 g of 2-butoxyethanol, 692 g of polypropylene glycol (with a weight average molecular weight (Mw) of about 3,000), and 8 g of stannous octoate was sequentially added into a reaction bottle, obtaining a mixture after stirring under nitrogen atmosphere. Next, the reaction bottle was heated to 170° C. Next, polyurethane broken foam was added into the reaction bottle with a feed rate of 50 g/minute, and a polyurethane alcoholysis was performed at a temperature of 170° C. and a rotating rate of 150 rpm under atmospheric pressure for 6 hours. Next, the result was subjected to a vacuum distillation process (5 torr, 190° C.) to remove remaining isooctyl alcohol, obtaining Composition (5), wherein Composition (5) was a homogeneous composition. Next, hydroxyl value and amine value of Composition (5) were measured, and the results are shown in Table 1.

Comparative Preparation Example 1

400 g of polyurethane (prepared by reacting 2,4-toluene diisocyanate with polypropylene glycol) (with a weight average molecular weight (Mw) of about 3,000) foam was cut by a cutter, obtaining a polyurethane broken foam with a width less than 3 cm. Next, 592 g of glycerol, and 8 g of stannous octoate was sequentially added into a reaction bottle, obtaining a mixture after stirring under nitrogen atmosphere. Next, the reaction bottle was heated to 170° C. Next, polyurethane broken foam was added into the reaction bottle with a feed rate of 50 g/minute, and a polyurethane alcoholysis was performed at a temperature of 170° C. and a rotating rate of 150 rpm for 6 hours, obtaining Composition (6). In Composition (6), there was obvious stratification, and Composition (6) was not a homogeneous composition. Next, hydroxyl value and amine value of Composition (6) were measured, and the results are shown in Table 1.

Comparative Preparation Example 2

400 g of polyurethane (prepared by reacting 2,4-toluene diisocyanate with polypropylene glycol) (with a weight average molecular weight (Mw) of about 3,000) foam was cut by a cutter, obtaining a polyurethane broken foam with a width less than 3 cm. Next, 25 g of diethylene glycol (diethylene glycol, DEG), 717 g of polypropylene glycol (with a weight average molecular weight (Mw) of about 3,000), and 8 g of stannous octoate was sequentially added into a reaction bottle, obtaining a mixture after stirring under nitrogen atmosphere. Next, the reaction bottle was heated to 190° C. Next, polyurethane broken foam was added into the reaction bottle with a feed rate of 50 g/minute, and a polyurethane alcoholysis was performed at a temperature of 170° C. and a rotating rate of 150 rpm for 6 hours, obtaining Composition (7), wherein Composition (7) was a homogeneous composition. Next, hydroxyl value and amine value of Composition (7) were measured, and the results are shown in Table 1.

TABLE 1

| | Preparation Example 1 | Preparation Example 2 | Preparation Example 3 | Preparation Example 4 | Preparation Example 5 | Comparative Preparation Example 1 | Comparative Preparation Example 2 |
|---|---|---|---|---|---|---|---|
| homogenous composition (Yes/No) | Yes | Yes | Yes | Yes | Yes | No | Yes |
| hydroxyl value (mgKOH/g) | 62.8 | 49.6 | 58.1 | 60.2 | 59.3 | 118 | 85 |
| amine value (mgKOH/g) | 12.6 | 9.5 | 7.1 | 6.8 | 7.5 | 13.5 | 17.5 |

As shown in Table 1, the obtained composition has high hydroxyl value due to the use of polyol (such as glycerol or diethylene glycol) as polyurethane alcoholysis agent. The product is also apt to be stratified due to the polarity. The compositions prepared from Preparation Examples 1-3 are homogeneous compositions with low hydroxyl value resulting from that the specific monohydric alcohol serves as polyurethane alcoholysis agent.

Polyurethane Foaming Process

Examples 1-4

Composition (1), polypropylene glycol (with a weight average molecular weight (Mw) of about 3,000), 2,4-toluene diisocyanate (TDI), foam stabilizer (with a trade number of Tegostab B8158), water, amine catalyst (with a trade number of A33), and organic metal catalyst (stannous octoate) were mixed to prepare Foaming Compositions (1)-(4), wherein ingredients of Foaming Compositions (1)-(4) are shown in Table 2. Herein, in Foaming Compositions (1)-(4), the number of isocyanate group to hydroxyl group was about 1.05:1.

Next, Foaming Compositions (1)-(4) were subjected to a foaming process individually, obtaining Foams (1)-(4). In the foaming process, the foaming composition was poured into a mold (with a dimension of 15 cm*15 cm*5 cm), and the mold was left at room temperature for 2 hours in order to cure the foaming composition. Next, the contraction ratio of obtained foam was determined. When the contraction ratio of foam is less than 5 vol %, the foam exhibited foamability. Next, the compressive strength of foam was measured, and the results were shown in Table 2. The compressive strength was determined by the method according to ASTM-D-D3574.

TABLE 2

|  | Example 1 | Example 2 | Example 3 | Example 4 |
|---|---|---|---|---|
| isocyanate-derived compound without hydroxyl group (wt %) | 5.7 | 11.3 | 14.1 | 17.0 |
| polypropylene glycol (Mw = 3000) (wt %) | 51.0 | 45.3 | 42.4 | 39.6 |
| TDI (wt %) | 37.7 | 37.8 | 37.9 | 37.8 |
| foam stabilizer (wt %) | 2.4 | 2.4 | 2.4 | 2.4 |
| water (wt %) | 3.0 | 3.0 | 3.0 | 3.0 |
| amine catalyst (wt %) | 0.1 | 0.1 | 0.1 | 0.1 |
| organic metal catalyst (wt %) | 0.1 | 0.1 | 0.1 | 0.1 |
| foamability (contraction ratio) | Yes (<5vol %) | Yes (<5vol %) | Yes (<5vol %) | Yes (<5vol %) |
| compressive strength (kPa) | 4.1 ± 0.9 | 5.2 ± 0.5 | 4.5 ± 0.3 | 5.3 ± 0.4 |

Examples 5-7

Composition (2), polypropylene glycol (with a weight average molecular weight (Mw) of about 5,000), 2,4-toluene diisocyanate (TDI), foam stabilizer (with a trade number of Tegostab B8158), water, amine catalyst (with a trade number of A33), and organic metal catalyst (stannous octoate) were mixed to prepare Foaming Compositions (5)-(7), wherein ingredients of Foaming Compositions (5)-(7) are shown in Table 3. Herein, in Foaming Compositions (5)-(7), the number of isocyanate group to hydroxyl group was about 105:1.

Next, Foaming Compositions (5)-(7) were subjected to a foaming process individually, obtaining Foams (5)-(7). In the foaming process, the foaming composition was poured into a mold (with a dimension of 15 cm*15 cm*5 cm), and the mold was left at room temperature for 2 hours in order to cure the foaming composition. Next, the contraction ratio of obtained foam was determined. When the contraction ratio of foam is less than 5 vol %, the foam exhibited foamability. Next, the compressive strength of foam was measured, and the results were shown in Table 3.

Example 8

Composition (3), polypropylene glycol (with a weight average molecular weight (Mw) of about 6,000), isophorone diisocyanate (IPDI), foam stabilizer (with a trade number of Tegostab B8158), water, amine catalyst (with a trade number of A33), and organic metal catalyst (stannous octoate) were mixed to prepare Foaming Composition (8), wherein ingredients of Foaming Composition (8) are shown in Table 3. Herein, in Foaming Composition (8), the number of isocyanate group to hydroxyl group was about 105:1.

Next, Foaming Composition (8) were subjected to a foaming process, obtaining Foam (8). In the foaming process, the foaming composition was poured into a mold (with a dimension of 15 cm*15 cm*5 cm), and the mold was left at room temperature for 2 hours in order to cure the foaming composition. Next, the contraction ratio of obtained foam was determined. When the contraction ratio of foam is less than 5 vol %, the foam exhibited foamability. Next, the compressive strength of foam was measured, and the results were shown in Table 3.

TABLE 3

|  | Example 5 | Example 6 | Example 7 | Example 8 |
|---|---|---|---|---|
| isocyanate-derived compound without hydroxyl group (wt %) | 3.6 | 7.2 | 14.3 | 10.0 |
| polypropylene glycol (Mw = 5000) (wt %) | 54.1 | 50.4 | 42.9 | — |
| polypropylene glycol (Mw = 6000) (wt %) | — | — | — | 43.3 |
| TDI (wt %) | 36.6 | 36.7 | 37.2 | — |
| IPDI (wt %) | — | — | — | 41.5 |
| foam stabilizer (wt %) | 2.4 | 2.4 | 2.4 | 2.2 |
| water (wt %) | 3.1 | 3.1 | 3.0 | 2.8 |
| amine catalyst (wt %) | 0.1 | 0.1 | 0.1 | 0.1 |
| organic metal catalyst (wt %) | 0.1 | 0.1 | 0.1 | 0.1 |
| foamability (contraction ratio) | Yes (<5vol %) | Yes (<5vol %) | Yes (<5vol %) | Yes (<5vol %) |
| compressive strength (kPa) | 12.9 ± 2.5 | 12.8 ± 0.6 | 12.6 ± 0.3 | 13.2 ± 0.7 |

Comparative Examples 1-2

Composition (4), polypropylene glycol (with a weight average molecular weight (Mw) of about 3,000), 2,4-toluene diisocyanate (TDI), foam stabilizer (with a trade number of Tegostab B8158), water, amine catalyst (with a trade number of A33), and organic metal catalyst (stannous octoate) were mixed to prepare Foaming Compositions (9) and (10), wherein ingredients of Foaming Compositions (9) and (10) are shown in Table 4. Herein, in Foaming Compositions (9) and (10), the number of isocyanate group to hydroxyl group was about 105:1.

Next, Foaming Compositions (9) and (10) were subjected to a foaming process, obtaining Foams (9) and (10). In the foaming process, the foaming composition was poured into a mold (with a dimension of 15 cm*15 cm*5 cm), and the mold was left at room temperature for 2 hours in order to cure the foaming composition. Next, the contraction ratio of obtained foam was determined. When the contraction ratio of foam is less than 5 vol %, the foam exhibited foamability. Next, the compressive strength of foam was measured, and the results were shown in Table 4.

TABLE 4

|  | Comparative Example 1 | Comparative Example 2 |
|---|---|---|
| hydroxyl-group-containing isocyanate-derived compound (wt %) | 1.2 | 1.6 |

TABLE 4-continued

|  | Comparative Example 1 | Comparative Example 2 |
|---|---|---|
| polypropylene glycol (Mw = 3000) (wt %) | 54.5 | 53.7 |
| TDI (wt %) | 38.8 | 39.3 |
| foam stabilizer (wt %) | 2.3 | 2.3 |
| water (wt %) | 3.0 | 2.9 |
| amine catalyst (wt %) | 0.1 | 0.1 |
| organic metal catalyst (wt %) | 0.1 | 0.1 |
| foamability (contraction ratio) | No (47 vol %) | No (63.8 vol %) |
| compressivestrength (kPa) | 11.7 ± 1.2 | 20.3 ± 4.7 |

Comparative Examples 3-5

Composition (5), polypropylene glycol (with a weight average molecular weight (Mw) of about 3,000), 2,4-toluene diisocyanate (TDI), foam stabilizer (with a trade number of Tegostab B8158), water, amine catalyst (with a trade number of A33), and organic metal catalyst (stannous octoate) were mixed to prepare Foaming Compositions (11)-(13), wherein ingredients of Foaming Compositions (11)-(13) are shown in Table 5. Herein, in Foaming Compositions (11)-(13), the number of isocyanate group to hydroxyl group was about 105:1.

Next, Foaming Compositions (11)-(13) were subjected to a foaming process individually, obtaining Foams (11)-(13). In the foaming process, the foaming composition was poured into a mold (with a dimension of 15 cm*15 cm*5 cm), and the mold was left at room temperature for 2 hours in order to cure the foaming composition. Next, the contraction ratio of obtained foam was determined. When the contraction ratio of foam is less than 5 vol %, the foam exhibited foamability. Next, the compressive strength of foam was measured, and the results were shown in Table 5.

TABLE 5

|  | Comparative Example 3 | Comparative Example 4 | Comparative Example 5 |
|---|---|---|---|
| hydroxyl-group-containing isocyanate-derived compound (wt %) | 3.0 | 4.5 | 7.5 |
| polypropylene glycol (Mw = 3000) (wt %) | 53.2 | 51.5 | 48.1 |
| TDI(wt %) | 38.2 | 38.4 | 39.0 |
| foam stabilizer (wt %) | 2.4 | 2.4 | 2.3 |
| water (wt %) | 3.0 | 3.0 | 2.9 |
| amine catalyst (wt %) | 0.1 | 0.1 | 0.1 |
| organic metal catalyst (wt %) | 0.1 | 0.1 | 0.1 |
| foamability (contraction ratio) | No (~14vol %) | No (~14vol %) | unable to mold |
| compressive strength (kPa) | 15.4 ± 2.4 | 20.3 ± 1.9 | — |

As shown in Table 2-5, when applying the product with high hydroxyl value of polyurethane alcoholysis in the polyurethane soft foaming to prepare polyurethane foam, the foamability of the polyurethane foam is reduced, the closed porosity of polyurethane foam is increased, and the foam cells are not effectively formed (i.e. the foam will shrink significantly to form a denser material after cooling) resulting from the crosslinking efficiency is increased due to the aromatic dicarbamate polyol of the product. Since the method of the disclosure employs the specific monohydric alcohol to perform polyurethane alcoholysis, the obtained isocyanate-derived compound does not have hydroxyl group. Therefore, even though the composition employs large amount of the isocyanate-derived compound without hydroxyl group, the foamability of the foam would not be deteriorated. As a result, the composition of the disclosure can be used in the polyurethane soft foaming process.

Adhesive Composition

Example 9

Composition (1), polypropylene glycol (with a weight average molecular weight (Mw) of about 3,000), hexamethylene diisocyanate (HDI), amine catalyst (with a trade number of A33), and organic metal catalyst (stannous octoate) were provided to prepare Adhesive Composition (1), wherein ingredients of Adhesive Composition (1) are shown in Table 6. Next, Adhesive Composition (1) was subjected to a curing test and a T-Peel Test, and the results are shown in Table 6. The curing test was performed at 30° C. and 50RH %. When the cured product after 1 day had a cured thickness of larger than 5 mm and had a hardness of A30, the test was marked with O. Otherwise, it was marked with X. T-Peel Test was determined by the method according to ASTM-D-D1876. Herein, two polycarbonate (PC) test samples (with a length of 300 mm, and a width of 25.4 mm) were bound together via Adhesive Composition (1), and the adhesion strength between the two polycarbonate (PC) test samples was determined. When the adhesion strength was equal to or larger than 5 kgf/cm$^2$, the test was marked with O. Otherwise, it was marked with X.

Example 10

Composition (2), polypropylene glycol (with a weight average molecular weight (Mw) of about 5,000), isophorone diisocyanate (IPDI), amine catalyst (with a trade number of A33), and organic metal catalyst (stannous octoate) were provided to prepare Adhesive Composition (2), wherein ingredients of Adhesive Composition (2) are shown in Table 6. Next, Adhesive Composition (2) was subjected to a curing test and a T-Peel Test, and the results are shown in Table 6.

TABLE 6

|  | Example 9 | Example 10 |
|---|---|---|
| isocyanate-derived compound without hydroxyl group (wt %) | 27 | 29.1 |
| polypropylene glycol (Mw = 3000)(wt%) | 59.2 | — |
| polypropylene glycol (Mw = 5000)(wt %) | — | 63.9 |
| HDI(wt %) | 13.6 |  |
| IPDI(wt %) |  | 6.8 |
| amine catalyst (wt %) | 0.1 | 0.1 |
| organic metal catalyst (wt %) | 0.1 | 0.1 |
| curing test | ◯ | ◯ |
| T-Peel Test | ◯ | ◯ |

As shown in Table 6, although the amount of isocyanate-derived compound without hydroxyl group in the composition of the disclosure is higher than 25%, the composition still exhibits superior solidifiability and stickability and serves as an adhesive composition.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A composition, comprising:
   50-99 parts by weight of polyether polyol, wherein the polyether polyol has a weight average molecular weight (Mw) of 200 to 10,000; and
   1-50 parts by weight of at least one compound having a structure represented by Formula (I)

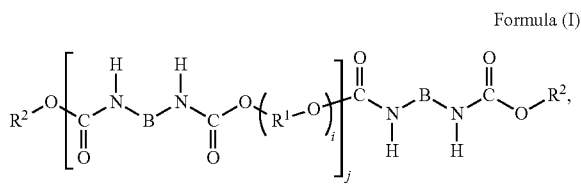

Formula (I)

wherein $R^1$ is independently $C_{1-6}$ alkylene group; i≥1; j≥1;
$R^2$ is a residual moiety of a monohydric alcohol eliminating a hydroxyl group, wherein the monohydric alcohol is 1-hexanol, 1-heptanol, 1-octanol, 1-nonanol, isononanol, 1-decanol, 1-undecyl alcohol, lauryl alcohol, 1-tridecyl alcohol, isotridecyl alcohol, 1-tetradecanol, 1-pentadecanol, 1-hexadecanol, 1-n-heptadecanol, 1-octadecyl alcohol, diethylene glycol monomethyl ether, diethylene glycol monoethyl ether, diethylene glycol monobutyl ether, or 2-butoxyethanol; and B is independently

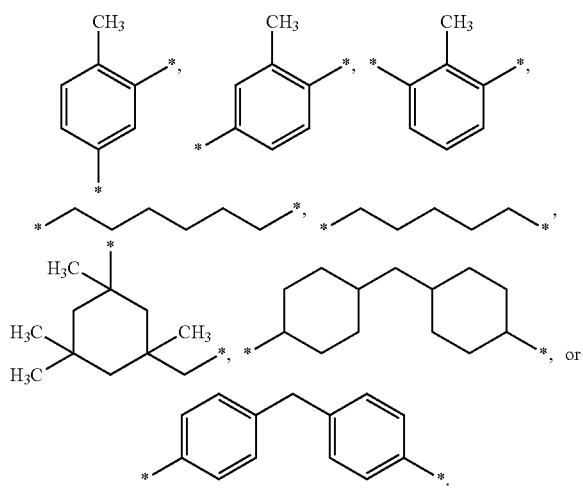

and the composition has a hydroxyl value of 10 mgKOH/g to 80 mgKOH/g.

2. The composition as claimed in claim 1, wherein the polyether polyol has a structure represented by Formula (II)

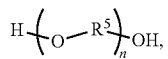

Formula (II)

wherein $R^5$ is independently $C_{1-6}$ alkylene group; n>1.

3. The composition as claimed in claim 1, wherein $R^1$ and $R^3$ are independently methylene group, ethylene group, propylene group, butylene group, pentylene group, hexylene group, or an isomer thereof.

4. The composition as claimed in claim 1, wherein B is a residual moiety of a diisocyanate compound eliminating two isocyanate groups, wherein the diisocyanate compound is 2,4-toluene diisocyanate, 2,5-toluene diisocyanate, 2,6-toluene diisocyanate, hexamethylene diisocyanate, pentamethylene diisocyanate, isophorone diisocyanate, 4,4'-Methylene dicyclohexyl diisocyanate, or 4,4'-methylenediphenyl diisocyanate.

5. The composition as claimed in claim 1, wherein $R^4$ is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, or an isomer thereof when k is 1 or 2; or $R^4$ is hexyl, heptyl, octyl, nonyl, decyl, undecyl, dodecyl, tridecyl, tetradecyl, pentadecyl, hexadecyl, heptadecyl, octadecyl, or an isomer thereof when k is 0.

6. The composition as claimed in claim 1, wherein the total weight of the polyether polyol and compound having a structure represented by Formula (I) is 100 parts by weight.

7. The composition as claimed in claim 1, wherein a moiety represented by

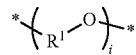

of the compound having the structure represented by Formula (I) has a weight average molecular weight (Mw) of 200 to 10,000.

8. The composition as claimed in claim 1, wherein i is an integer from 4 to 226.

9. The composition as claimed in claim 1, wherein j is 0 or an integer from 1 to 30.

10. The composition as claimed in claim 1, further comprising:
    a diisocyanate compound.

11. The composition as claimed in claim 10, wherein the diisocyanate compound is 2,4-toluene diisocyanate, 2,5-toluene diisocyanate, 2,6-toluene diisocyanate, hexamethylene diisocyanate, pentamethylene diisocyanate, isophorone diisocyanate, 4,4'-methylene dicyclohexyl diisocyanate, 4,4'-methylenediphenyl diisocyanate, lysine diisocyanate, or a combination thereof.

12. The composition as claimed in claim 6, further comprising:
    0.1 to 30 parts by weight of additive, wherein the additive is organic metal catalyst, amine catalyst, cross-linking agent, blowing agent, foam stabilizer, plasticizer, melt strength enhancer, antioxidant, antistick agent, antistatic agent, flame retardant, water, or a combination thereof.

13. A method for preparing a composition, comprising:
    providing 1-50 parts by weight of an organic filler, wherein the organic filler is prepared by subjecting a polyurethane to alcoholysis in presence of a monohydric alcohol, and the organic filler has a structure represented by Formula (I)

Formula (I)

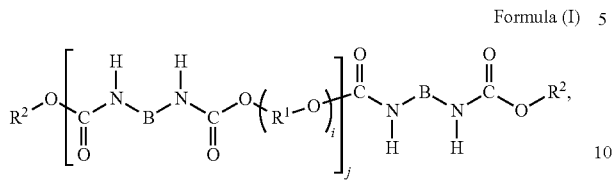

wherein $R^1$ is independently $C_{1-6}$ alkylene group; $i \geq 1$; $j \geq 1$;

$R^2$ is a residual moiety of a monohydric alcohol eliminating a hydroxyl group, wherein the monohydric alcohol is 1-hexanol, 1-heptanol, 1-octanol, 1-nonanol, isononanol, 1-decanol, 1-undecyl alcohol, lauryl alcohol, 1-tridecyl alcohol, isotridecyl alcohol, 1-tetradecanol, 1-pentadecanol, 1-hexadecanol, 1-n-heptadecanol, 1-octadecyl alcohol, diethylene glycol monomethyl ether, diethylene glycol monoethyl ether, diethylene glycol monobutyl ether, or 2-butoxyethanol; and B is independently

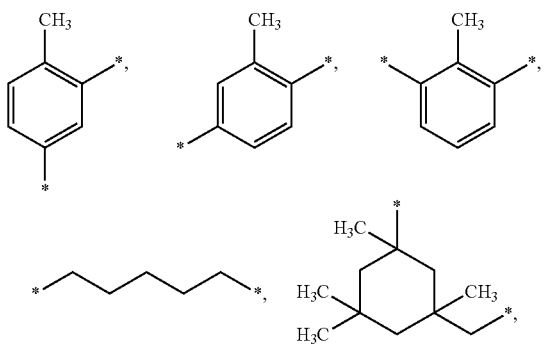

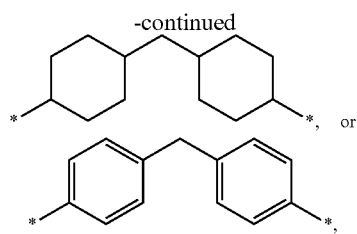

and the composition has a hydroxyl value of 10 mgKOH/g to 80 mgKOH/g;

providing 50-99 parts by weight of a polyether polyol, wherein the total weight of organic filler and polyether polyol is 100 parts by weight;

providing a diisocyanate compound, wherein the molar ratio of the diisocyanate compound to the polyether polyol is 1:1 to 2.2:1; and mixing the organic filler, the polyether polyol and the diisocyanate compound, obtaining the composition.

14. The method as claimed in claim 13, wherein the polyether polyol is prepared by subjecting the polyurethane to alcoholysis.

15. The method as claimed in claim 13, wherein the polyether polyol has a weight average molecular weight (Mw) of 200 to 10,000, and the polyether polyol is polyethylene glycol (PEG), polypropylene glycol, polybutylene glycol, propylene epoxide-epoxyethane copolymer, glycerol-propylene epoxide-epoxyethane copolymer, trimethylolpropane-propylene epoxide-epoxyethane copolymer, ethylene glycol-propylene epoxide-epoxyethane copolymer, propylene glycol-propylene epoxide-epoxyethane copolymer, or polytetrahydrofuran.

16. A material, which is prepared from the composition as claimed in claim 1.

* * * * *